UNITED STATES PATENT OFFICE.

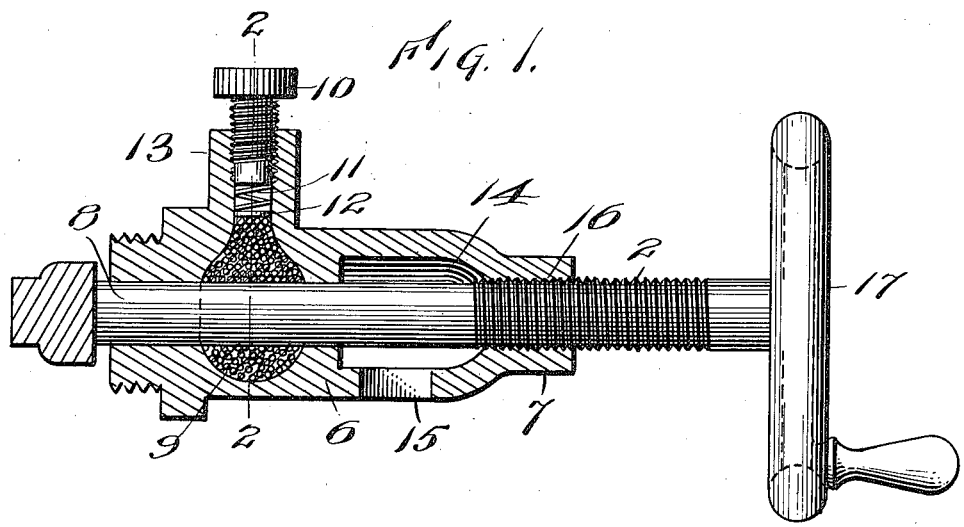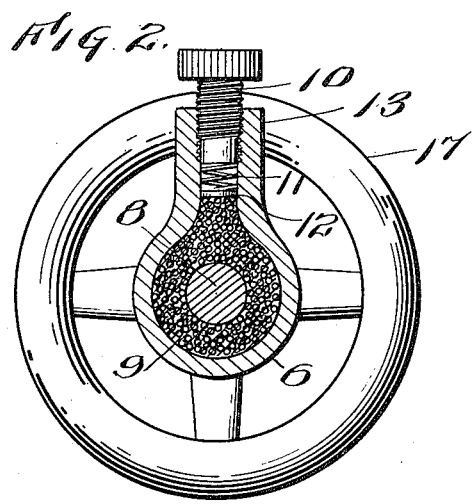

THOMAS A. JOHNSTON, OF CHADRON, NEBRASKA, ASSIGNOR OF ONE-FOURTH TO THOMAS L. FINLEY, OF LONG PINE, NEBRASKA.

ROD-PACKING.

953,271.  Specification of Letters Patent.  Patented Mar. 29, 1910.

Application filed July 12, 1909. Serial No. 507,123.

*To all whom it may concern:*

Be it known that I, THOMAS A. JOHNSTON, a citizen of the United States, residing at Chadron, in the county of Dawes and State of Nebraska, have invented certain new and useful Improvements in Rod-Packing, of which the following is a specification.

This invention relates to rod packing for nonvibrating rods, and has for its object to provide an improved construction for holding the packing and supporting the rod, and the arrangement is particularly suitable for use with injectors or under other conditions where packing is desirable, but where no lateral vibration of the rod exists.

The invention includes the use of "shot" packing which is compressed against the rod by means of a screw plug and a spring follower, and in which the packing can be easily renewed without removing the casing from the device to which it is applied.

The invention is illustrated in the accompanying drawing in which—

Figure 1 is a longitudinal section; Fig. 2 is a cross section on the line 2—2 of Fig. 1.

Referring specifically to the drawings, 6 indicates a body or casing which may be applied to the valve or other structure by any suitable means. I have shown a reduced neck 7 at the inner end of said body, to screw into a threaded hole formed to receive it in the structure to which the valve rod or other rod is to be applied. The body 6 is provided with a globular chamber extending around the rod or valve stem 8, and this chamber is filled with shot packing 9 which is compressed by means of a screw plug 10 bearing on a coiled spring 11 behind a follower 12 which holds the packing under pressure at all times; and by screwing in the plug the pressure may be increased as desired. The purpose of the packing is to form a steam tight joint, and when under pressure the shot will assume a proper position to form a tight joint with the rod, in a manner similar to that disclosed in my former patents, Nos. 779,480, 872,132 and 894,739. Graphite, soft metal, or other material may be substituted for the shot packing, or may be mixed therewith. The screw 10 screws into a nipple 13 extending laterally from the body of the gland.

Near the outer end the body is recessed as indicated at 14 around the rod, and said recess has one or more outlet openings 15, and at its extremity the bore of the body is threaded at 16 to receive the screw 2 of the rod 8, whereby the valve or other part is operated by turning the rod, conveniently by means of a crank wheel 17. The space 14 is to allow the escape or dislodgment of any matter which may work out from the packing around the rod, so that dirt, condensation or other foreign matter which may be forced out from the packing will not get back into the thread. This prevents binding of the rod, or rusting or other injury to the threads, which, when it occurs, makes the rod stick, or difficult to turn.

It will be seen that the packing may be removed or other structure which is applied, by simply taking out the screw plug 10. The shot packing is particularly susceptible of convenient renewal under such conditions. The device provides a very simple form of packing for nonvibrating rods such as valve stems and the like.

I claim:

1. A rod packing comprising a body through which the rod extends, and provided with an inner chamber with packing therein around the rod, and also with an outer chamber around the rod, said outer chamber having an opening in the wall thereof.

2. A rod packing comprising a body having a bore and inner and outer chambers through which the rod extends, the bore being threaded at its outer end to receive corresponding threads on the rod, the inner chamber having compressible packing therein and means to compress the same, and the outer chamber having an opening in the wall thereof.

In testimony whereof, I affix my signature in presence of two witnesses.

THOMAS A. JOHNSTON.

Witnesses:
B. F. PITMAN,
H. J. SCHLEY.